(12) United States Patent
Kusunoki

(10) Patent No.: US 12,044,277 B2
(45) Date of Patent: Jul. 23, 2024

(54) CAM CLUTCH

(71) Applicant: TSUBAKIMOTO CHAIN CO., Osaka (JP)

(72) Inventor: Sota Kusunoki, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/133,221

(22) Filed: Apr. 11, 2023

(65) Prior Publication Data

US 2023/0341010 A1 Oct. 26, 2023

(30) Foreign Application Priority Data

Apr. 21, 2022 (JP) ................... 2022-070333

(51) Int. Cl.
*F16D 41/07* (2006.01)
(52) U.S. Cl.
CPC .................... *F16D 41/07* (2013.01)
(58) Field of Classification Search
CPC ........ F16D 41/07; F16D 41/08; F16D 41/082; F16D 2023/123
See application file for complete search history.

(56) References Cited

U.S. PATENT DOCUMENTS

| | | | |
|---|---|---|---|
| 5,343,992 A * | 9/1994 | Stark | F16D 41/061 192/93 C |
| 5,676,226 A | 10/1997 | Lampela et al. | |
| 7,766,141 B2 * | 8/2010 | Segawa | F16D 41/07 192/41 A |
| 9,212,707 B2 * | 12/2015 | Kato | F16D 41/07 |
| 2014/0202821 A1 | 7/2014 | Schotten | |
| 2023/0040408 A1 * | 2/2023 | Yamamoto | F16H 61/32 |

FOREIGN PATENT DOCUMENTS

| | | |
|---|---|---|
| DE | 102007015104 A1 | 10/2008 |
| JP | 2011-231828 A | 11/2011 |
| JP | 2015113850 A | 6/2015 |

OTHER PUBLICATIONS

European Search Report dated Aug. 10, 2023, issued in counterpart EP Application No. 23164973.2. (7 pages).
Certification of correction of U.S. Pat. No. 5,676,226 A1. (1 page).

* cited by examiner

*Primary Examiner* — Stacey A Fluhart
(74) *Attorney, Agent, or Firm* — WHDA, LLP

(57) ABSTRACT

To provide a simple-structured cam clutch capable of preventing unwanted jamming of cams, thereby enabling smooth operation including switching operation between operation modes, and offering potential for higher functionality and size reduction. The plurality of cams of the cam clutch include first cams and second cams having different engaging directions. The cam clutch includes an operation mode switching mechanism for switching operation modes, and a switch actuating mechanism. The operation mode switching mechanism includes an outer cage ring, an inner cage ring, and a position-restricting cage ring. The switch actuating mechanism includes an outer guide, an inner guide, and a rotation ring circumferentially movable relative to the outer guide and inner guide and provided for controlling the axial positions of the outer cage ring and inner cage ring.

12 Claims, 11 Drawing Sheets

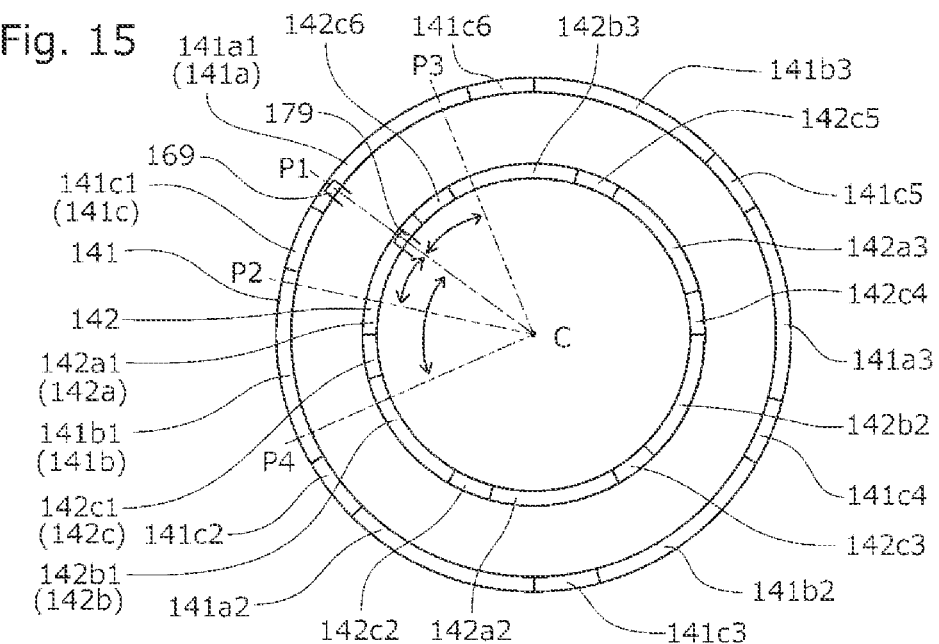
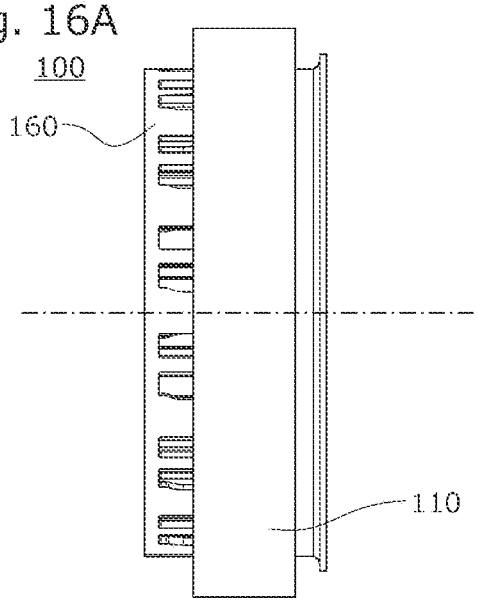
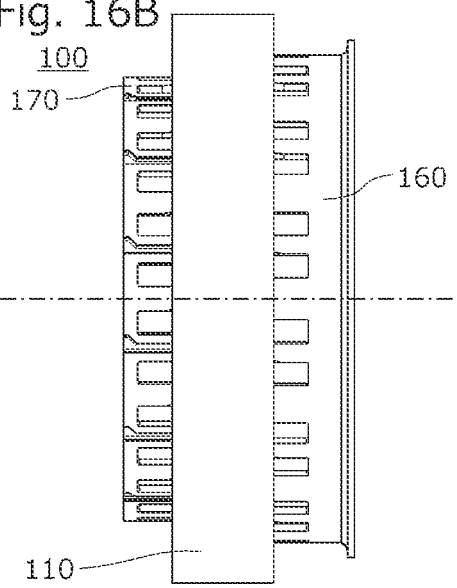

CAM CLUTCH

BACKGROUND OF THE INVENTION

1. Field of the Invention

The present invention relates to a cam clutch configured to be capable of switching from one operation mode to another.

2. Description of the Related Art

As one type of clutch that controls torque transmission and interruption, two-way clutches that can switch between drive and freewheel modes in both forward and reverse directions are known.

Japanese Patent Application Publication No. 2011-231828, for example, describes a clutch configured to be capable of switching from one to another among three operation modes, i.e., a two-way free mode allowing rotation in both forward and reverse directions; a one-way lock mode allowing rotation only in the forward direction and prohibiting rotation in the reverse direction; and a one-way lock mode allowing rotation only in the reverse direction and prohibiting rotation in the forward direction, by control of a retainer that retains both first sprags and second sprags that are biased by a biasing means toward opposite rotation locking directions.

SUMMARY OF THE INVENTION

The above-described two-way clutch forces all of the first sprags and second sprags to tilt by control of the retainer when switching operation modes, which means that the clutch cannot operate in a two-way lock mode that prohibits relative rotation between the outer race and the inner race in both forward and reverse directions.

In the two-way clutch described above, the first sprags and second sprags are biased to stay in contact with the outer race and inner race so that one group of sprags tilt and immediately start wedging against the outer race and inner race upon torque application to the outer race or inner race, while the other group of sprags remain in sliding contact with the outer race and inner race and are kept in the standby state.

When the torque is removed, the wedging group of sprags tilt in the disengaging direction to switch to a freewheeling state. At this time, there is a possibility that the other group of sprags tilt in the engaging direction and start wedging against the outer race and inner race before the wedging group of cams are disengaged, whereupon unwanted jamming can occur in which all the cams are jammed at the same time.

When this happens, all the sprags are engaged with a high surface contact, so that a large force is required to change the orientation of the sprags to switch the operation mode of the cam clutch from the lock mode that prohibits relative rotation of the outer race and inner race in one or both of forward and reverse directions to the free mode that allows relative rotation of the outer race and inner race in both directions. This may be detrimental to the engaging surfaces of the sprags in contact with the outer race and inner race or the raceways of the outer race and inner race, and may shorten the service life of the cam clutch.

In addition, the components provided for changing the orientation of the sprags need to have high rigidity.

The cams or sprags in the cam clutch generally have arcuate curved side faces. Such an outer contour, along with the positions of contact between the cams and retainers serving as cam orientation change means, makes it difficult to allow the cams to roll a long distance.

The present invention has been made based on the circumstances described above and it is an object of the invention to provide a simple-structured cam clutch capable of preventing unwanted jamming of cams, thereby ensuring smooth operation including the switching between operation modes, and offering potential for higher functionality and size reduction.

The present invention achieves the above object by providing a cam clutch including an outer race and an inner race that are provided to be coaxial and rotatable relative to each other; and a plurality of cams that are circumferentially arranged between the outer race and the inner race, the plurality of cams including first cams and second cams that wedge against the outer race and the inner race in different directions from each other. The cam clutch further includes an operation mode switching mechanism that switches operation modes of the cam clutch, and a switch actuating mechanism that actuates the operation mode switching mechanism. The operation mode switching mechanism includes an outer cage ring configured to be axially movable independently of rotation of the outer race and the inner race and to change an orientation of the first cams, an inner cage ring configured to be axially movable independently of rotation of the outer race and the inner race and to change an orientation of the second cams, and a position-restricting cage ring provided between the outer cage ring and the inner cage ring and restricting a degree of freedom of circumferential movement of the outer cage ring and the inner cage ring. The switch actuating mechanism includes an outer guide defining an axial position of the outer cage ring, an inner guide provided in a fixed position relative to the outer guide and defining an axial position of the inner cage ring, and a rotation ring circumferentially movable relative to the outer guide and the inner guide and provided for controlling the axial position of the outer cage ring and the inner cage ring.

According to one aspect of the present application 1, the outer cage ring may be assigned the function of controlling the orientation of the first cams, the inner cage ring may be assigned the function of controlling the orientation of the second cams, and the degree of freedom of circumferential movement of the outer cage ring and inner cage ring may be restricted by the position-restricting cage ring. This way, the cams can be tilted to change the orientation and maintained in that orientation only by moving one or both of the outer cage ring and inner cage ring in the axial direction. This enables configuration of a high-functionality cam clutch switchable to four operation modes with a simple structure.

By restricting the degree of freedom of circumferential movement of the outer cage ring and inner cage ring, simultaneous wedging of both of the first cams and second cams against the outer race and inner race in the transition of cam orientation is avoided. Thus smooth operation can be realized and high responsiveness can be achieved.

The switch actuating mechanism that actuates the operation mode switching mechanism includes a rotation ring circumferentially movable relative to the outer guide and inner guide and provided for controlling the axial position of the outer cage ring and inner cage ring. Namely, the rotation ring, by being rotated, can change the axial positions of the outer cage ring and inner cage ring along the outer guide and inner guide, respectively. The cam clutch can thus be switched to four operation modes in an even simpler manner.

Another advantage is improved space economy particularly in the axial direction, compared for example with a configuration in which the outer cage ring and inner cage ring are moved by respective axially moving cylinders.

According to another aspect, the outer guide is configured to receive and allow the outer-cage protruding member to slide thereon, and includes an outer advance guide portion, an outer retract guide portion, and an outer slanted guide portion. The inner guide is configured to receive and allow the inner-cage protruding member to slide thereon, and includes an inner advance guide portion, an inner retract guide portion, and an inner slanted guide portion. Thus the outer cage ring and inner cage ring can readily be moved in the axial direction by sliding the outer-cage protruding member and inner-cage protruding member on the outer guide and inner guide, respectively.

The axial positions of the outer advance guide portion and outer retract guide portion, and the inner advance guide portion and inner retract guide portion, for example, may be determined to keep the first cams and second cams in respective desired orientations. This way, the cams can be reliably retained in each of the four operation modes of the cam clutch by only rotating the rotation ring to a predetermined position.

According to another aspect, the rotation ring includes an outer tubular wall formed between the outer cage ring and the outer guide, an inner tubular wall formed between the inner cage ring and the inner guide, an outer slide hole extending through the outer tubular wall, and an inner slide hole extending through the inner tubular wall. The outer slide hole is formed such as to allow the outer-cage protruding member to pass through and make contact with the outer guide. The inner slide hole is formed such as to allow the inner-cage protruding member to pass through and make contact with the inner guide. Therefore, with the axial length of the outer slide hole being made the same as the length from the outer advance guide portion to the outer retract guide portion, and with the axial length of the inner slide hole being made the same as the length from the inner advance guide portion to the inner retract guide portion, the outer-cage protruding member and inner-cage protruding member can move axially along the outer guide and inner guide respectively in a coordinated manner with the rotation of the rotation ring.

According to another aspect, the outer advance guide portion and the inner advance guide portion lie within a same circumferential range at least at one or more points, and the outer retract guide portion and the inner retract guide portion lie within a same circumferential range at least at one or more points. This way, with the outer-cage protruding member and inner-cage protruding member being set in the same radial direction, for example, the outer cage ring and inner cage ring can be readily switched to one of four combinations of positions by rotation of the rotation ring, i.e., with the respective protruding members moved to the outer advance guide portion and inner advance guide portion, or the outer advance guide portion and inner retract guide portion, or the outer retract guide portion and inner advance guide portion, or the outer retract guide portion and inner retract guide portion.

Thus the cams can be maintained in four combinations of orientations corresponding to the four operation modes, which are switched by setting the outer cage ring and inner cage ring at respective axial positions.

According to another aspect, it is also possible to tilt only one of the first cams or the second cams by suitably changing the opening shape of the respective first cam holding parts and second cam holding parts of the outer cage ring and inner cage ring that constitute the operation mode switching mechanism. Namely, the outer cage ring and inner cage ring are each integrally formed with a mechanism for changing the orientation of the cams, which simplifies the structure and leads to size reduction, as well as enables a reduction in the number of components and an increase in the holding torque. The first cam holding parts of the outer cage ring and the second cam holding parts of the inner cage ring are openings of an irregular shape rather than a simple rectangle, which include an opening-width transition part where the opening width changes in a continuous manner. This allows the cams that could slightly jam due to production errors or the like to be disengaged with a small thrust.

Moreover, additional operation modes and switching between these operation modes can be realized by suitably changing the opening shapes of the first cam holding parts and second cam holding parts of the outer cage ring and inner cage ring.

According to another aspect, the degree of freedom of circumferential movement of the outer cage ring and inner cage ring can be restricted with a simple structure.

According to another aspect, when the outer cage ring is set in position where the first cams are engaged with the outer race and inner race, the outward protrusion of the position-restricting cage ring is circumferentially movable, so that the outer cage ring is allowed to move with a correct degree of freedom relative to the position-restricting cage ring. Likewise, when the inner cage ring is set in position where the second cams are engaged with the outer race and inner race, the inward protrusion of the position-restricting cage ring is circumferentially movable, so that the inner cage ring is allowed to move with a correct degree of freedom relative to the position-restricting cage ring. This way, the first cams and second cams can be engaged with the outer race and inner race in a correct manner.

According to another aspect, the outer race additionally serves the function of keeping the cams in position in the axial direction. This way the cam clutch can operate reliably as intended without an increase in the number of components and with a simple structure.

According to another aspect, smaller-size cams can have a large rotation angle while keeping the ability to move with the outer cage ring and inner cage ring in a highly coordinated manner. Therefore the cams can be reduced in size, which enables configuration of a more compact cam clutch. Moreover, the engaging torque can be reduced in a controlled manner because the cams can be tilted with a smaller torque.

According to another aspect, the positions of contact between the cams and the outer cage ring and inner cage ring can readily be adjusted, so that the cams can move in a wider range while coordinating better with the cage rings.

According to another aspect, the respective axial positions of the first rotating member and the second rotating member can be changed only by rotating the rotation ring.

Also, space economy can be improved particularly in the axial direction, compared for example with a configuration in which the first rotating member and second rotating member are moved by respective axially moving cylinders.

According to another aspect, the first guide is configured to receive and allow the first protruding member to slide thereon, and includes a first advance guide portion, a first retract guide portion, and a first slanted guide portion. The second guide is configured to receive and allow the second protruding member to slide thereon, and includes a second advance guide portion, a second retract guide portion, and a second slanted guide portion. Thus the first rotating member and second rotating member can readily be moved in the axial direction by sliding the first protruding member and second protruding member on the first guide and second guide, respectively.

According to another aspect, the rotation ring includes a first tubular wall formed between the first rotating member and the first guide, a second tubular wall formed between the second rotating member and the second guide, a first slide hole extending through the first tubular wall, and a second slide hole extending through the second tubular wall. The first slide hole is formed such as to allow the first protruding member to pass through and make contact with the first guide. The second slide hole is formed such as to allow the second protruding member to pass through and make contact with the second guide. Therefore, with the axial length of the first slide hole being made the same as the length from the first advance guide portion to the first retract guide portion, and with the axial length of the second slide hole being made the same as the length from the second advance guide portion to the second retract guide portion, the first protruding member and second protruding member can move axially along the first guide and second guide respectively in a coordinated manner with the rotation of the rotation ring.

BRIEF DESCRIPTION OF THE DRAWINGS

FIG. 15 is a top plan view illustrating the outer guide and inner guide shown in FIG. 7 viewed from the front in the axial direction;

FIG. 16A and FIG. 16B are side views of the cam clutch shown in FIG. 1 illustrating the switching action from a forward lock mode to a two-way free mode;

DESCRIPTION OF THE PREFERRED EMBODIMENTS

Figure 1:
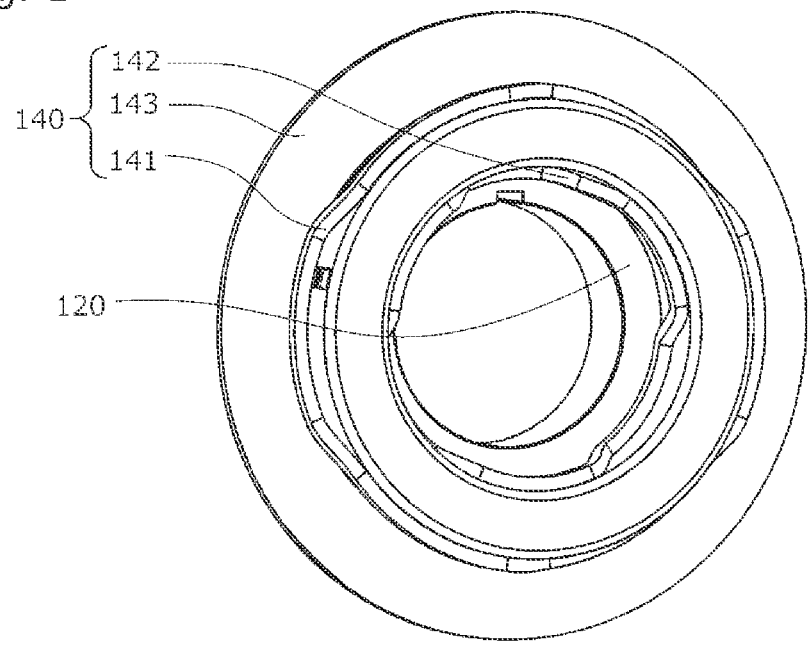
FIG. 1 is a perspective view illustrating a configuration example of a cam clutch according to the present invention viewed from the front in the axial direction.
Figure 2:
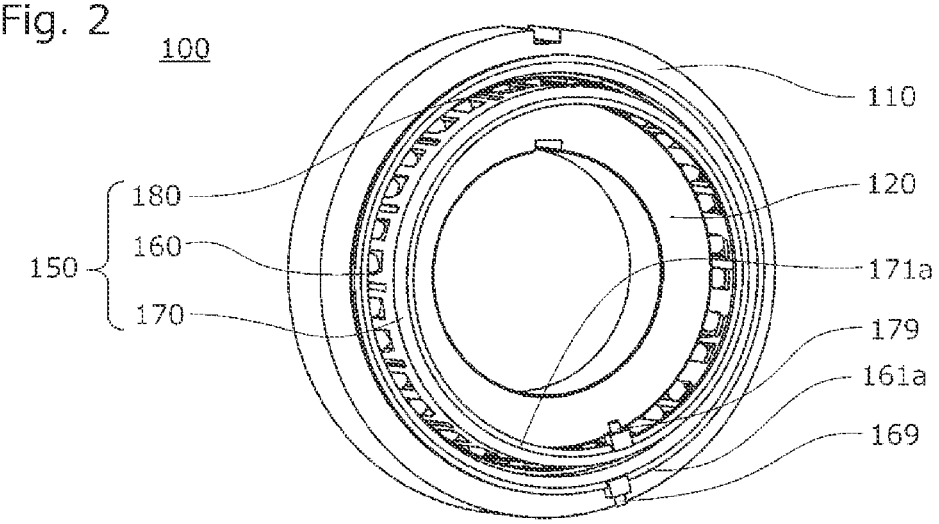
FIG. 2 is a perspective view illustrating a configuration example of the cam clutch according to the present invention viewed from the front in the axial direction, without the switch actuating mechanism.
Figure 3:
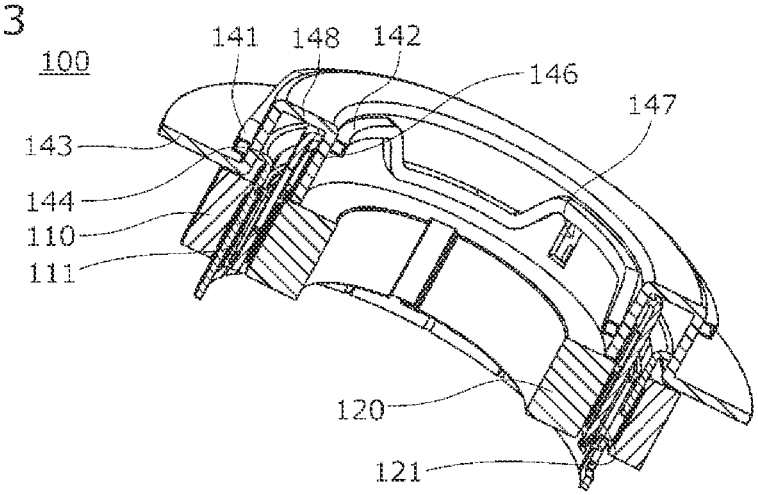
FIG. 3 is a perspective view of the cam clutch shown in FIG. 1 with a cross section along a plane containing the rotation axis of the cam clutch.
Figure 4:
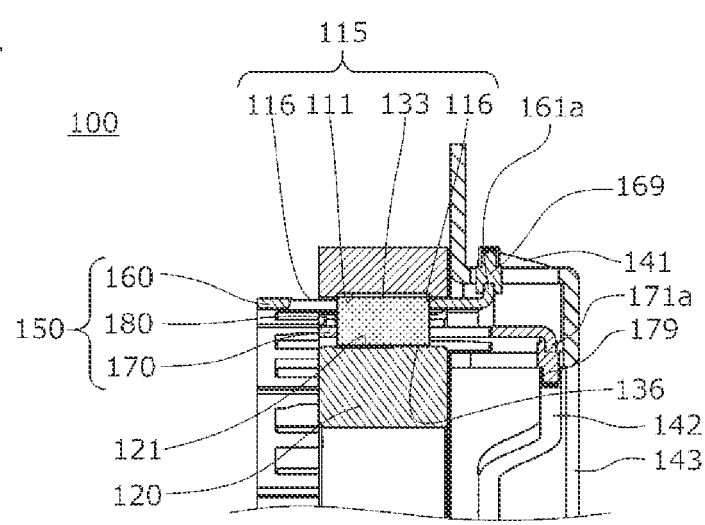
FIG. 4 is an axial cross-sectional view illustrating part of a cross section of the cam clutch shown in FIG. 1 along a plane containing the rotation axis of the cam clutch.

Embodiments of the present invention are described with reference to FIG. 1 to FIG. 15, FIG. 16A, FIG. 16B, FIG. 17A, FIG. 17B, FIG. 18A, FIG. 18B, FIG. 19A, FIG. 19B, FIG. 20A, and FIG. 20B.

As shown in FIG. 1 to FIG. 5, the cam clutch 100 according to the present invention includes: an outer race 110 and an inner race 120 coaxial and rotatable relative to each other; a plurality of circumferentially spaced cams in an annular space between raceways 111 and 121 of the outer race 110 and inner race 120 serving as sprags to transmit and interrupt torque between the outer race 110 and inner race 120; an outer cage ring 160 and an inner cage ring 170 coaxially and rotatably provided to the outer race 110 and inner race 120, respectively, and retaining each of the plurality of cams between the outer race 110 and the inner race 120; and a position-restricting cage ring 180 that restricts the degree of freedom of circumferential movement of the outer cage ring 160 and inner cage ring 170.

Figure 5:
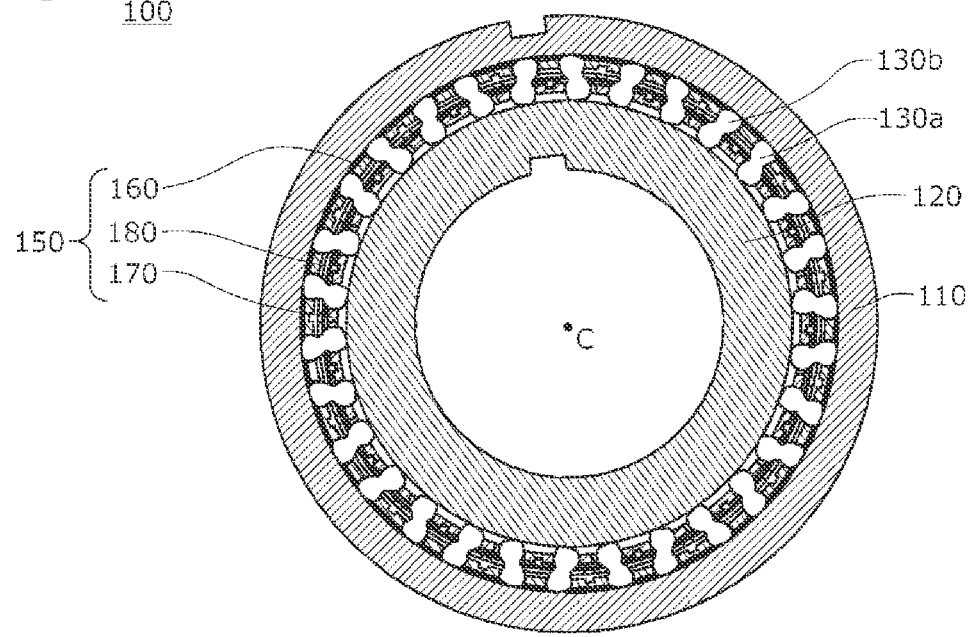
FIG. 5 is a radial cross section of the cam clutch shown in FIG. 1 along a plane perpendicular to the rotation axis of the cam clutch, viewed from the rear in the axial direction.

Reference symbol C in FIG. 5 denotes the rotation axis.

Further, the cam clutch includes a switch actuating mechanism 140, which has a rotation ring 143 configured to rotate the outer cage ring 160 and inner cage ring 170 around the rotation axis C from the front side in the axial direction, and an outer guide 141 and an inner guide 142 that define the respective axial positions of the outer cage ring 160 and inner cage ring 170.

The outer race 110 has a position restricting part 115 that restricts axial movement of each of the plurality of cams. In this embodiment, the position restricting part 115 is formed by inward ribs 116, each of which is provided at each of both axial ends on the inner circumferential surface of the outer race 110 to protrude radially inward all around. The plurality of cams are each positioned between the inward ribs 116 so that axial movement of each cam is restricted.

The plurality of cams include first cams 130*a* and second cams 130*b* that wedge against the outer race 110 and inner race 120 in different directions.

In this embodiment, the first cams 130*a* and second cams 130*b* have outer shapes that are identical to each other, for example, the first cams 130*a* reversed front to back being used as the second cams 130*b*.

The first cams 130a and second cams 130b are alternately and circumferentially equally spaced, for example.

The arrangement of the first cams 130a and second cams 130b is not limited to this particular layout. The first cams 130a and second cams 130b may not necessarily alternate in the circumferential direction, and the numbers of the first cams 130a and second cams 130b may differ.

The engaging direction of the first cam 130a is clockwise in FIG. 5 (hereinafter referred to as "forward direction"). The first cam 130a is configured to wedge against the outer race 110 and inner race 120 when the outer race 110 is rotated in the forward direction, or when the inner race 120 is rotated counterclockwise in FIG. 5 (hereinafter referred to as "reverse direction").

The engaging direction of the second cam 130b is counterclockwise. The second cam 130b is configured to wedge against the outer race 110 and inner race 120 when the outer race 110 is rotated in the reverse direction, or when the inner race 120 is rotated in the forward direction.

The first cam 130a and second cam 130b have an outer contour with curved parts along an involute as viewed in the axial direction or in plan view.

Figure 6:
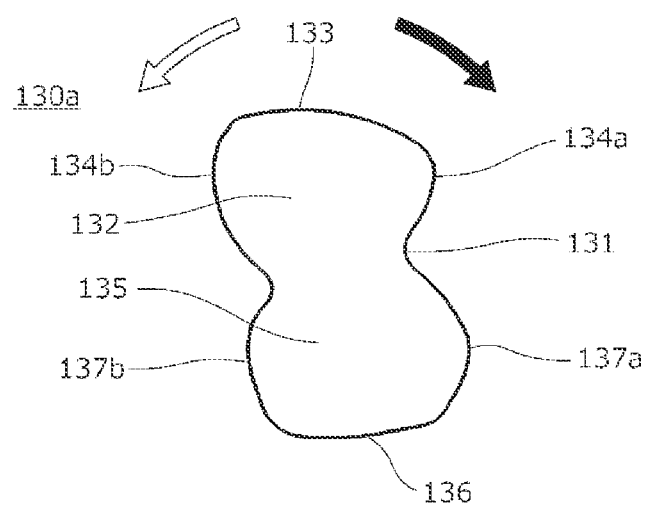
FIG. 6 is a plan view illustrating the configuration of the cam.

One configuration example of the first cam 130a is shown in FIG. 6.

In FIG. 6, the solid arrow indicates the engaging direction of the first cam 130a and the open arrow indicates the disengaging direction of the first cam 130a.

As mentioned above, the second cam 130b is the first cam 130a reversed front to back, i.e., the second cam 130b has the same shape as the first cam 130a, and therefore description thereof will be omitted.

The first cam 130a has a substantially figure-eight shape, with a constricted part 131 in the middle in the radial direction.

A head part 132 on the radially outer side of the constricted part 131 of the first cam 130a has an outer-race engaging surface 133. Both side faces 134a and 134b smoothly continuous with the outer-race engaging surface 133 and in contact with the outer cage ring 160 are curved surfaces formed such that the head part 132 has a constant width irrespective of the orientation of the first cam 130a. Specifically, the side faces 134a and 134b of the head part 132 are formed along curves of involutes of the same basic circle as viewed in the axial direction or in plan view.

A leg part 135 on the radially inner side of the constricted part 131 of the first cam 130a has an inner-race engaging surface 136. Both side faces 137a and 137b smoothly continuous with the inner-race engaging surface 136 and in contact with the inner cage ring 170 are curved surfaces formed such that the leg part 135 has a constant width irrespective of the orientation of the first cam 130a.

Specifically, the side faces 137a and 137b of the leg part 135 are formed along curves of involutes of the same basic circle as viewed in the axial direction or in plan view.

This outer contour of the first cam 130a and the second cam 130b enables a small-size cam to have a large rotation angle while keeping the ability to engage with the outer cage ring 160 and inner cage ring 170 in a highly coordinated manner.

Therefore the cams can be reduced in size, which enables configuration of a more compact cam clutch 100, and moreover, the engaging torque can be reduced in a controlled manner because the cams can be tilted with a smaller torque.

Optionally, a biasing member may be provided to bias the first cams 130a and second cams 130b toward an engaging direction against the outer race 110 and inner race 120.

Figure 7:
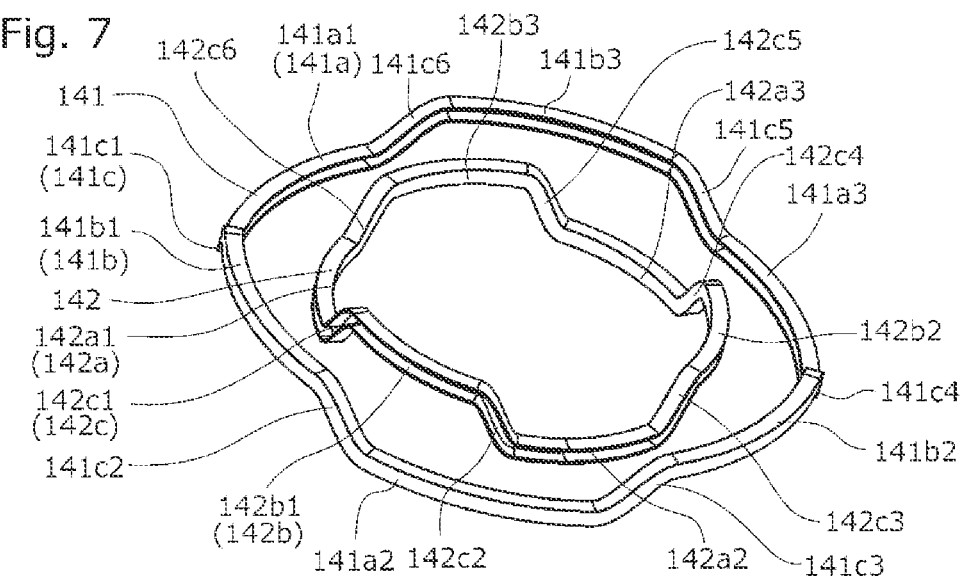
FIG. 7 is a perspective view illustrating an outer guide and an inner guide in the cam clutch shown in FIG. 1.
Figure 8:
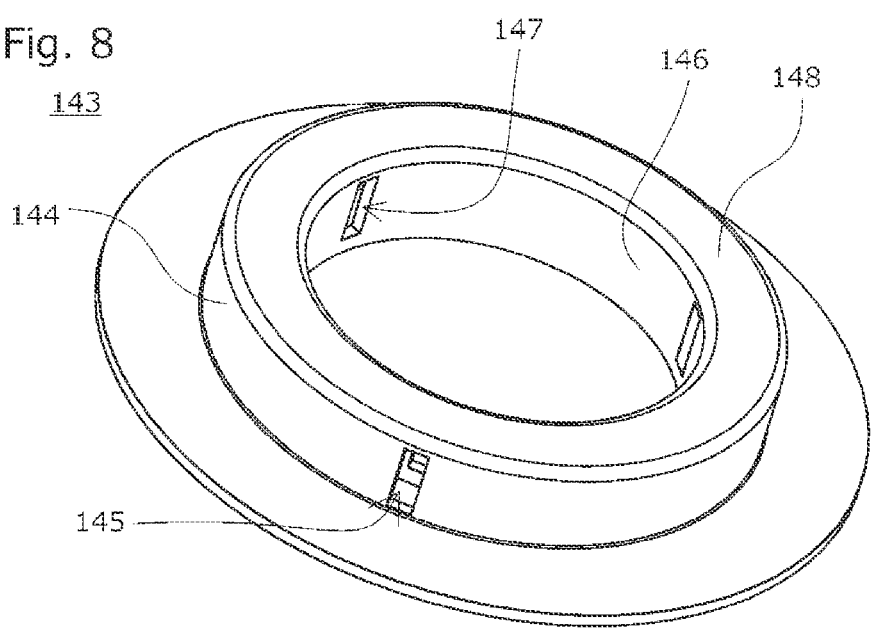
FIG. 8 is a perspective view illustrating a rotation ring in the cam clutch shown in FIG. 1.

The switch actuating mechanism 140 is provided to operate the operation mode switching mechanism 150 to be described later, and includes the rotation ring 143 independently rotatable relative to each of the outer race 110 and inner race 120 and configured to rotate an outer-cage protruding member 169 and an inner-cage protruding member 179 to be described later, and the outer guide 141 and inner guide 142 that are rotatable relative to the rotation ring 143, as shown in FIG. 7 and FIG. 8.

The rotation ring 143 includes an axially extending outer tubular wall 144 interposed between the outer cage ring 160 and the outer guide 141, an axially extending inner tubular wall 146 interposed between the inner cage ring 170 and the inner guide 142, and a connection part 148 connecting the outer tubular wall 144 and inner tubular wall 146.

The outer tubular wall 144 is provided with an outer slide hole 145 that allows the outer-cage protruding member 169 to be described later to pass through and make contact with the outer guide 141. The inner tubular wall 146 is provided with an inner slide hole 147 that allows the inner-cage protruding member 179 to be described later to pass through and make contact with the inner guide 142.

The outer guide 141 is configured to receive and allow the outer-cage protruding member 169 to slide thereon. The outer guide includes an outer advance guide portion 141a that keeps the outer cage ring 160 at an axially advanced position closer to the outer race 110 via the outer-cage protruding member 169, an outer retract guide portion 141b that keeps the outer cage ring 160 at an axially retracted position away from the outer race 110, and an outer slanted guide portion 141c coupling the outer advance guide portion 141a and outer retract guide portion 141b. The outer guide 141 causes the outer cage ring 160 to move back and forth in the axial direction as the outer cage ring 160 rotates.

The inner guide 142 is configured to receive and allow the inner-cage protruding member 179 to slide thereon. The inner guide includes an inner advance guide portion 142a that keeps the inner cage ring 170 at an axially advanced position closer to the inner race 120 via the inner-cage protruding member 179, an inner retract guide portion 142b that keeps the inner cage ring 170 at an axially retracted position away from the inner race 120, and an inner slanted guide portion 142c coupling the inner advance guide portion 142a and inner retract guide portion 142b. The inner guide 142 causes the inner cage ring 170 to move back and forth in the axial direction as the inner cage ring 170 rotates.

The outer guide 141 and inner guide 142 are fixed in position relative to each other. Pairs of outer advance guide portion 141a and inner advance guide portion 142a, and pairs of outer retract guide portion 141b and inner retract guide portion 142b, are disposed such as to include a circumferential portion aligned in the same radial direction from the rotation axis C.

This way, the outer cage ring 160 and inner cage ring 170 are each moved back and forth in the axial direction and fixedly set in position in one of the operation modes to be described later by the rotation ring 143, with the outer-cage protruding member 169 and inner-cage protruding member 179 being kept in the same radial direction from the rotation axis C.

The outer slanted guide portion 141c and inner slanted guide portion 142c are not disposed to have a portion aligned in the same radial direction from the rotation axis C.

The cam clutch 100 according to this embodiment can switch from one to another of four operating modes: a forward lock mode prohibiting relative rotation between the outer race 110 and the inner race 120 in the forward direction; a reverse lock mode prohibiting relative rotation between the outer race 110 and the inner race 120 in the reverse direction; a two-way lock mode prohibiting relative rotation of the outer race 110 and the inner race 120 in both forward and reverse directions; and a two-way free mode allowing relative rotation of the outer race 110 and the inner race 120 in both forward and reverse directions, by means of an operation mode switching mechanism 150.

In this embodiment, the operation mode switching mechanism 150 is made up of the outer cage ring 160, inner cage ring 170, and position-restricting cage ring 180.

Figure 9:
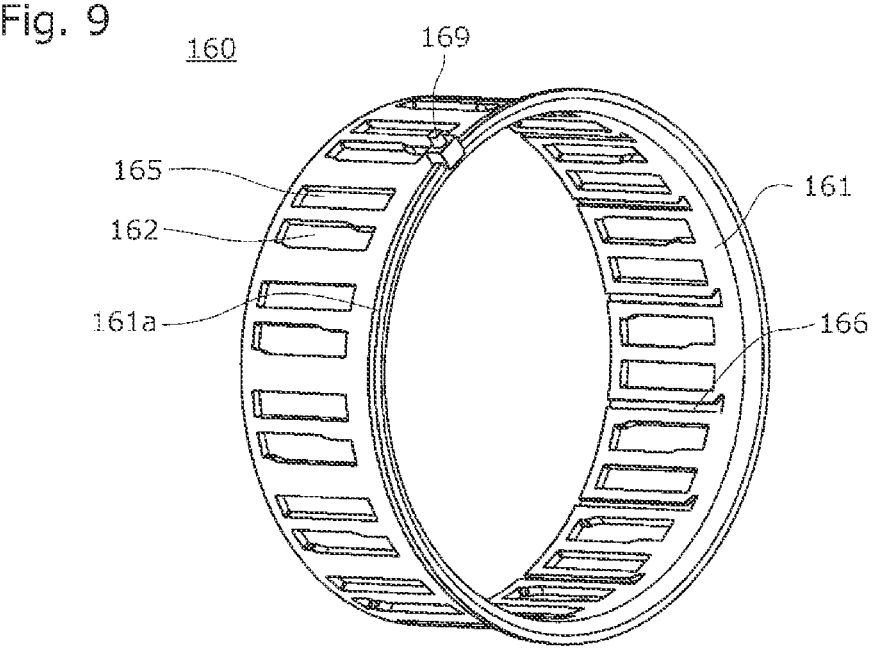
FIG. 9 is a perspective view illustrating the configuration of an outer cage ring viewed from the front in the axial direction.
Figure 10:
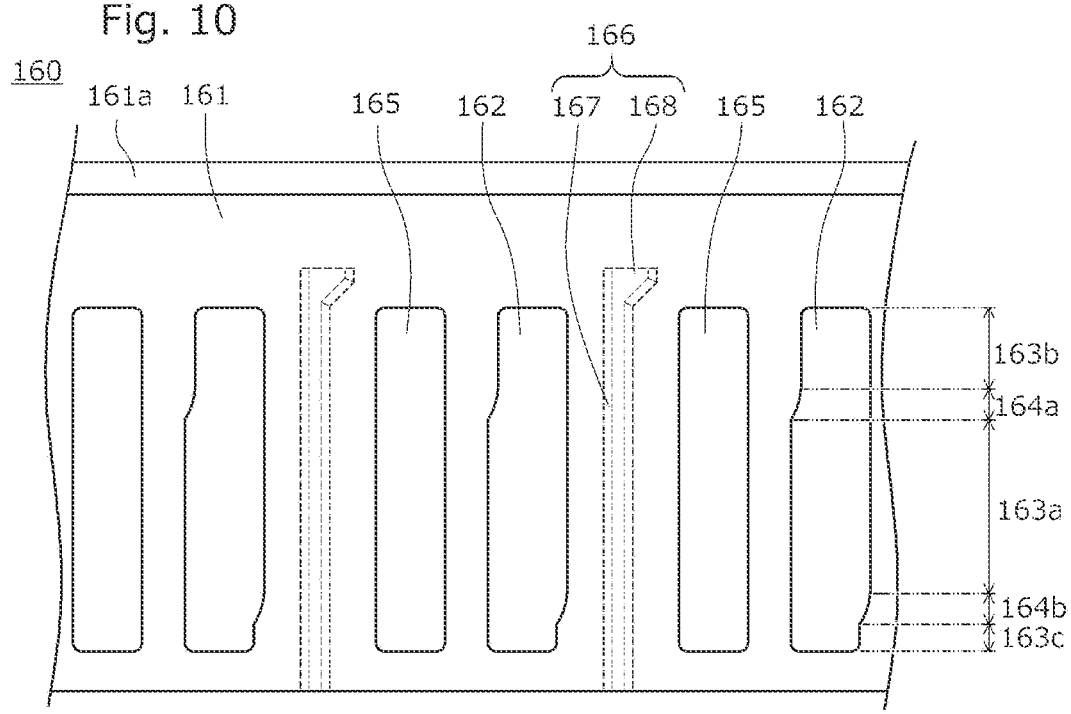
FIG. 10 is a developed view of part of the outer cage ring shown in FIG. 9.

The outer cage ring 160 includes an axially extending cylindrical body part 161, as shown in FIG. 9 and FIG. 10.

The body part 161 has first cam holding parts 162 that accommodate the head parts 132 of the first cams 130a and hold the first cams 130a, and second cam holding parts 165 that accommodate the head parts of the second cams 130b and hold the second cams 130b, alternating in the circumferential direction.

The outer cage ring 160 has an outer-cage flange 161a and the outer-cage protruding member 169 slidably coupled on the outer-cage flange 161a and protruding radially outward, at the axial front end.

First cam holding parts 162 of the outer cage ring 160 are configured to include an opening-width transition part where the opening width changes continuously in the axial direction.

Specifically, the first cam holding part 162 includes a guide space 163a with a constant opening width in the axial direction, a first orientation-keeping space 163b having a smaller opening width than that of the guide space 163a and extending on the axial front side (upper side in FIG. 10) of the guide space 163a, and a second orientation-keeping space 163c having a smaller opening width than that of the guide space 163a and extending on the axial rear side (lower side in FIG. 10) of the guide space 163a.

The first orientation-keeping space 163b continues from the guide space 163a via a first opening-width transition part 164a where the opening width is reduced continuously toward the front in the axial direction.

The second orientation-keeping space 163c continues from the guide space 163a via a second opening-width transition part 164b where the opening width is reduced continuously toward the rear in the axial direction. The first opening-width transition part 164a is formed by an inwardly protruded opening edge that makes contact with the first cam 130a tilted in the disengaging direction (left side in FIG. 10), and the second opening-width transition part 164b is formed by an inwardly protruded opening edge that makes contact with the first cam 130a tilted in the engaging direction (right side in FIG. 10).

The second cam holding parts 165 of the outer cage ring 160 are rectangular, with a constant opening width in the axial direction.

The outer cage ring 160 is axially movable independently of the rotation of the outer race 110 and inner race 120 and thus can tilt the first cams 130a to change the orientation of the first cams 130a while keeping the second cams 130b in the same orientation.

As described above, the first cam holding parts 162 of the outer cage ring 160 are not simple rectangular openings but are irregular-shape open windows that reduce in opening width at both axial ends. Thus the cams that can slightly jam due to production errors or the like can be disengaged with a small thrust. Moreover, additional operation modes and switching between these operation modes can be realized by suitably changing the opening shape of the first cam holding parts 162.

The outer cage ring 160 is formed with axially extending inner surface grooves 166 on an inner face of the body part 161, each between the first cam holding part 162 and the second cam holding part 165 adjacent the first cam holding part 162 on the side toward which the first cam 130a is tilted in the engaging direction.

The inner surface grooves 166 each include a guide groove 167 extending straight from the rear edge to the front edge in the axial direction of the body part 161, and a slide groove 168 continuous from the axial front end of the guide groove 167.

The slide groove 168 extends circumferentially toward the engaging direction of the first cam 130a, and is formed such as to allow circumferential movement of an outward protrusion 185 of the position-restricting cage ring 180 to be described later when the outer cage ring 160 is set to keep the first cams 130a in the engaged position.

Figure 11:
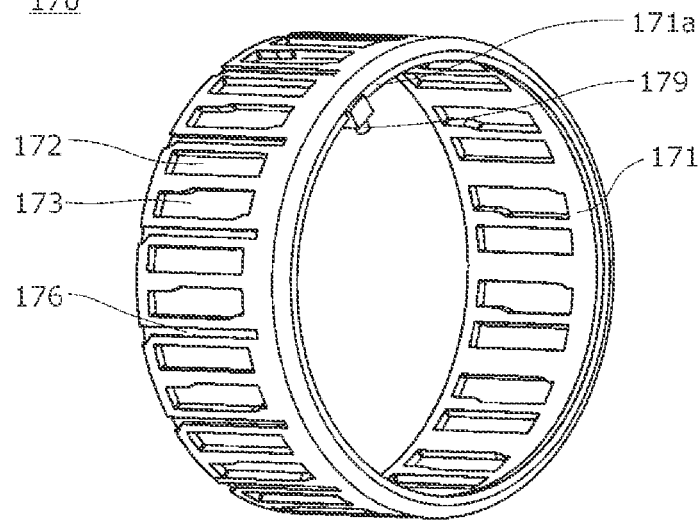
FIG. 11 is a perspective view illustrating the configuration of an inner cage ring viewed from the front in the axial direction.
Figure 12:
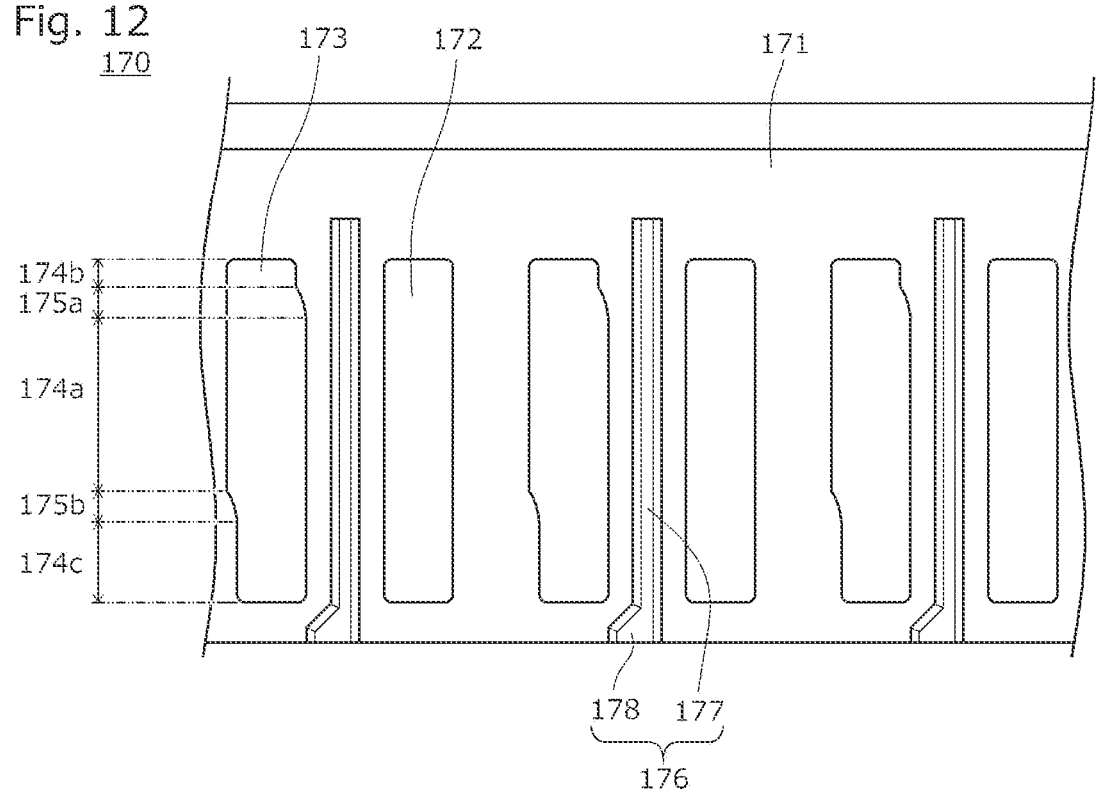
FIG. 12 is a developed view of part of the inner cage ring shown in FIG. 11.

The inner cage ring 170 includes an axially extending cylindrical body part 171, as shown in FIG. 11 and FIG. 12.

The body part 171 has first cam holding parts 172 that accommodate the leg parts 135 of the first cams 130a and hold the first cams 130a, and second cam holding parts 173 that accommodate the leg parts of the second cams 130b and hold the second cams 130b, alternating in the circumferential direction.

The inner cage ring 170 has an inner-cage flange 171a and the inner-cage protruding member 179 slidably coupled on the inner-cage flange 171a and protruding radially outward, at the axial front end.

The first cam holding parts 172 of the inner cage ring 170 are rectangular, with a constant opening width in the axial direction.

The second cam holding parts 173 of the inner cage ring 170 are configured to include an opening-width transition part where the opening width changes continuously in the axial direction.

Specifically, the second cam holding part 173 includes a guide space 174a with a constant opening width in the axial direction, a first orientation-keeping space 174b having a smaller opening width than that of the guide space 174a and extending on the axial front side (upper side in FIG. 12) of the guide space 174a, and a second orientation-keeping space 174c having a smaller opening width than that of the guide space 174a and extending on the axial rear side (lower side in FIG. 12) of the guide space 174a. The first orientation-keeping space 174b continues from the guide space 174a via a first opening-width transition part 175a where the opening width is reduced continuously toward the front in the axial direction.

The second orientation-keeping space 174c continues from the guide space 174a via a second opening-width transition part 175b where the opening width is reduced continuously toward the rear in the axial direction.

The first opening-width transition part 175a is formed by an inwardly protruded opening edge that makes contact with the second cam 130b tilted in the disengaging direction (right side in FIG. 12), and the second opening-width transition part 175b is formed by an inwardly protruded opening edge that makes contact with the second cam 130b tilted in the engaging direction (left side in FIG. 12).

The inner cage ring 170 is axially movable independently of the rotation of the outer race 110 and inner race 120 and thus can tilt the second cams 130b to change the orientation of the second cams 130b while keeping the first cams 130a in the same orientation.

As described above, the second cam holding parts 173 of the inner cage ring 170 are not simple rectangular openings but are irregular-shape open windows that reduce in opening width at both axial ends. Thus the cams that can slightly jam due to production errors or the like can be disengaged with a small thrust. Moreover, additional operation modes and switching between these operation modes can be realized by suitably changing the opening shape of the second cam holding parts 173.

The inner cage ring 170 is formed with axially extending outer surface grooves 176 on an outer face of the body part 171, each between the second cam holding part 173 and the first cam holding part 172 adjacent the second cam holding part 173 on the side toward which the second cam 130b is tilted in the disengaging direction.

The outer surface grooves 176 each include a guide groove 177 extending straight from the front edge to the rear edge in the axial direction of the body part 171, and a slide groove 178 continuous from the axial rear end of the guide groove 177.

The slide groove 178 extends circumferentially toward the engaging direction of the second cam 130b, and is formed such as to allow circumferential movement of an inward protrusion 186 of the position-restricting cage ring 180 to be described later when the inner cage ring 170 is set to keep the second cams 130b in the engaged position.

While the outer cage ring 160 and inner cage ring 170 in this embodiment respectively include one each outer-cage protruding member 169 and inner-cage protruding member 179, there may be any suitable number of protruding members in accordance with the shapes of the outer guide 141, inner guide 142, outer slide hole 145, and inner slide hole 147.

The operation mode switching mechanism 150 of the cam clutch 100 in this embodiment includes the position-restricting cage ring 180 as mentioned above, which restricts the degree of freedom of circumferential movement of the outer cage ring 180 and inner cage ring 170.

Therefore, the degree of freedom of circumferential movement of the outer cage ring 160 and inner cage ring 170 relative to the position-restricting cage ring 180 can be adjusted suitably in accordance with each operation mode to keep the first cams 130a and second cams 130b in correct orientation.

Figure 13:
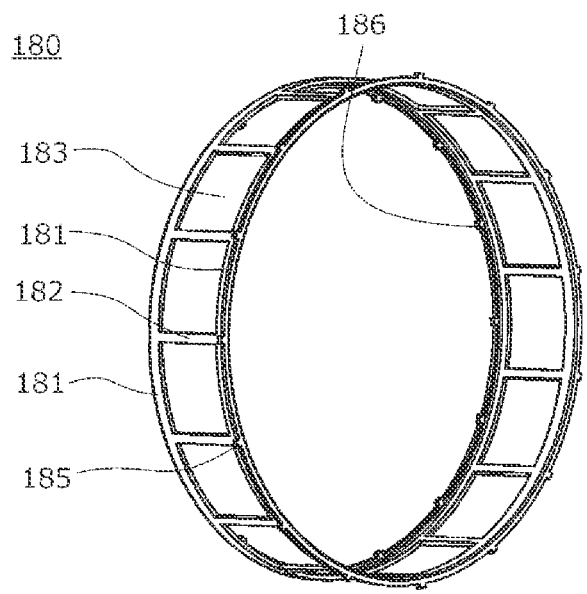
FIG. 13 is a perspective view illustrating the configuration of a position-restricting cage ring viewed from the front in the axial direction.
Figure 14:
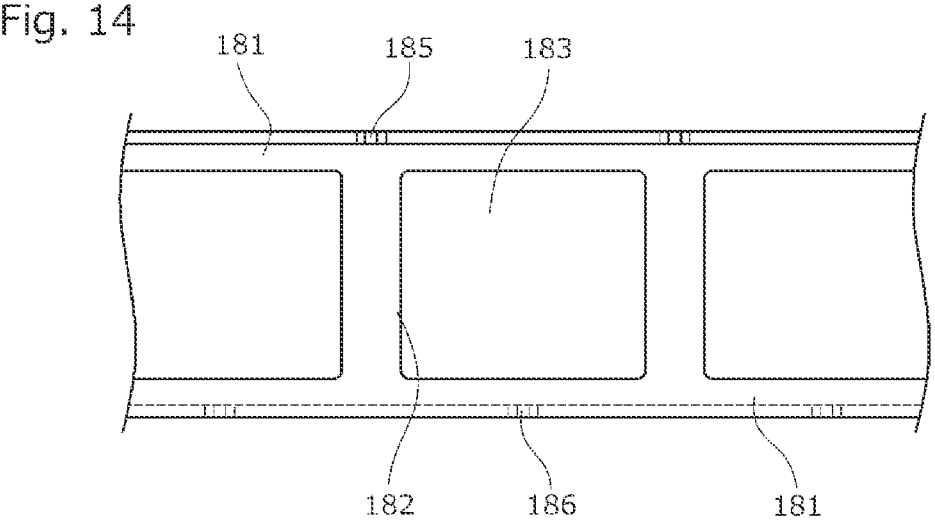
FIG. 14 is a developed view of part of the position-restricting cage ring shown in FIG. 13.

The position-restricting cage ring 180 is made up of a pair of circumferentially extending annular parts 181 parallel to each other, and a plurality of connecting parts 182 connecting the annular parts 181 in the axial direction at a predetermined distance as shown in FIG. 13 and FIG. 14.

The space between adjacent connecting parts 182 each forms a pocket part 183 that can accommodate one each of the first cam 130a and second cam 130b. The pocket parts 183 are circumferentially equally spaced apart.

The position-restricting cage ring 180 includes outward protrusions 185 radially projecting outward from the axial front end and slidably engaged with the inner surface grooves 166 of the outer cage ring 160, and inward protrusions 186 radially projecting inward from the axial rear end and slidably engaged with the outer surface grooves 176 of the inner cage ring 170.

The operation of the cam clutch 100 according to this embodiment is described below with reference to FIG. 15, FIG. 16A, FIG. 16B, FIG. 17A, FIG. 17B, FIG. 18A, FIG. 18B, FIG. 19A, FIG. 19B, FIG. 20A, FIG. 20B, FIG. 21A, and FIG. 21B.

In this embodiment, the outer-cage protruding member 169 of the outer cage ring 160 is positioned to pass through the outer slide hole 145 and to slide inside the outer guide 141, and the inner-cage protruding member 179 of the inner cage ring 170 is positioned to pass through the inner slide hole 147 and to slide inside the inner guide 142. Therefore, when the rotation ring 143 is rotated, the outer-cage protruding member 169 and inner-cage protruding member 179 can be rotated simultaneously, being pushed sideways respectively by the outer slide hole 145 and inner slide hole 147.

The outer-cage protruding member 169 is coupled on the outer-cage flange 161a such as to be slidable in the circumferential direction, and the inner-cage protruding member 179 is coupled on the inner-cage flange 171a such as to be slidable in the circumferential direction. The outer slide hole 145 and inner slide hole 147 are formed at the same circumferential position relative to the rotation axis C so that the outer-cage protruding member 169 and inner-cage protruding member 179 are also kept oriented in the same radial direction.

Namely, when the rotation ring 143 is rotated, the outer-cage protruding member 169 and inner-cage protruding member 179 rotate or circumferentially slide relative to the outer cage ring and inner cage ring inside the outer guide 141 and inner guide 142 while being oriented in the same radial direction. This way, the outer cage ring 160 and inner cage ring can be readily switched to various combinations of axial positions for allowing the clutch to operate in four operation modes.

Figure 17A:
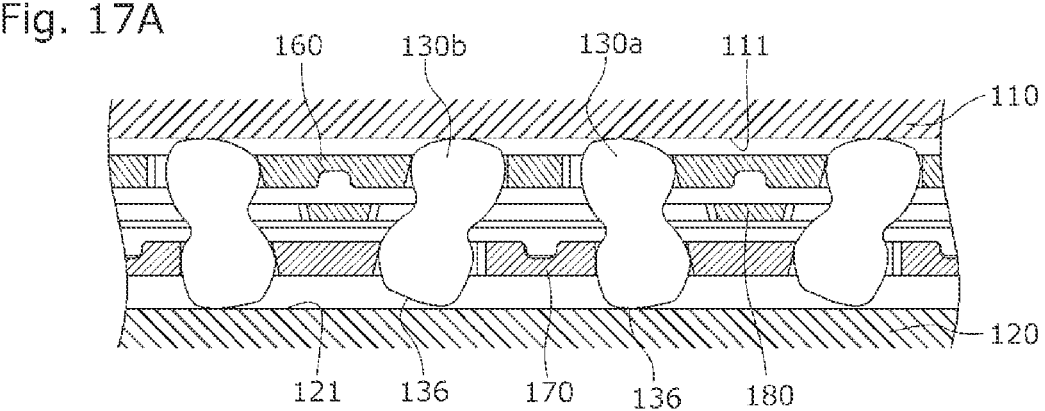
FIG. 17A and FIG. 17B are schematic diagrams of the cam clutch shown in FIG. 1 illustrating the switching action from the forward lock mode to the two-way free mode.

First, when the outer-cage protruding member 169 is positioned on an outer advance guide portion 141a1 and the inner-cage protruding member 179 is positioned on an inner advance guide portion 142a1 (P1) as shown in FIG. 15, the outer cage ring 160 and inner cage ring 170 are both positioned at the axial rear end as shown in FIG. 16A. In this state, as shown in FIG. 17A, the first cams 130a are kept in the standby state so that the first cams can start wedging against the outer race 110 and inner race 120 immediately upon torque application to the outer race 110 or the inner race 120.

Meanwhile, the inner-race engaging surface 136 of the second cams 130b is kept separated from the raceway 121 of the inner race 120. Namely, the cam clutch 100 is in the forward lock mode that prohibits relative rotation of the outer race 110 and inner race 120 in the forward direction.

Figure 17B:
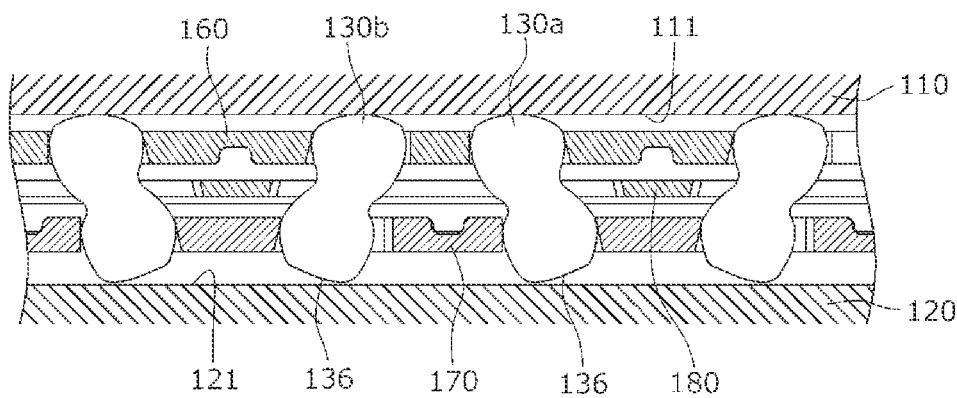

When the rotation ring 143 is rotated in this state to move the outer-cage protruding member 169 and inner-cage protruding member 179 from P1 to P2, for example, the outer-cage protruding member 169 alone slides on an outer slanted guide portion 141c1 over to an outer retract guide portion 141b1 as shown in FIG. 15, thereby moving the outer cage ring 160 axially frontward as shown in FIG. 16B. This causes the second opening-width transition part 164b of the first cam holding parts 162 of the outer cage ring 160 to push the head parts 132 of the first cams 130a as shown in FIG. 17B.

At this time, the inner-cage protruding member 179 slides only within the inner advance guide portion 142a1 and therefore does not cause the inner cage ring 170 to move in the axial direction.

Thus the first cams 130a are tilted in the disengaging direction, and kept in the orientation in which the inner-race engaging surface 136 of the first cams 130a is separated from the raceway 121 of the inner race 120.

Meanwhile, the second cams 130b are kept in the orientation in which the inner-race engaging surface 136 of the second cams 130b is separated from the raceway 121 of the inner race 120. This is because the second cam holding parts 165 of the outer cage ring 160 have a constant opening width in the axial direction, and because the degree of freedom in circumferential direction of the outer cage ring 160 and inner cage ring 170 is limited by the position-restricting cage ring 180.

This switches the operating mode of the cam clutch 100 from the forward lock mode to the two-way free mode that allows relative rotation of the outer race 110 and inner race 120 in both forward and reverse directions.

For convenience of explanation, FIG. 16A and FIG. 16B illustrate the raceway 111 of the outer race 110 and the raceway 121 of the inner race 120 as parallel flat surfaces.

Conversely, to switch the operation mode of the cam clutch 100 from the two-way free mode to the forward lock mode, the rotation ring 143 is rotated to move the outer-cage protruding member 169 and inner-cage protruding member 179 from P2 to P1, causing only the outer-cage protruding member 169 to slide on the outer slanted guide portion 141c1 over to the outer advance guide portion 141a1 as shown in FIG. 15, so that the outer cage ring 160 is moved axially rearward.

At this time, the inner-cage protruding member 179 slides only within the inner advance guide portion 142a1 and therefore does not cause the inner cage ring 170 to move in the axial direction.

This movement causes the first opening-width transition part 164a of the first cam holding parts 162 of the outer cage ring 160 to push the head parts 132 of the first cams 130a, so that the first cams 130a are tilted in the engaging direction, and kept in the standby state in which the first cams 130a can start engaging with the outer race 110 and inner race 120 immediately upon torque application to the outer race 110 or the inner race 120.

The outward protrusions 185 of the position-restricting cage ring 180 are allowed to move in the circumferential direction because of the slide grooves 168 of the inner surface grooves 166 of the outer cage ring 160.

This suitably adjusts the degree of freedom of circumferential movement of the outer cage ring 160 relative to the position-restricting cage ring 180 to keep the first cams 130a in correct orientation.

Meanwhile, the second cams 130b are kept in the orientation in which the inner-race engaging surface 136 is separated from the raceway 121 of the inner race 120.

In this way, the operation mode of the cam clutch 100 is switched from the two-way free mode to the forward lock mode.

Figure 18A:
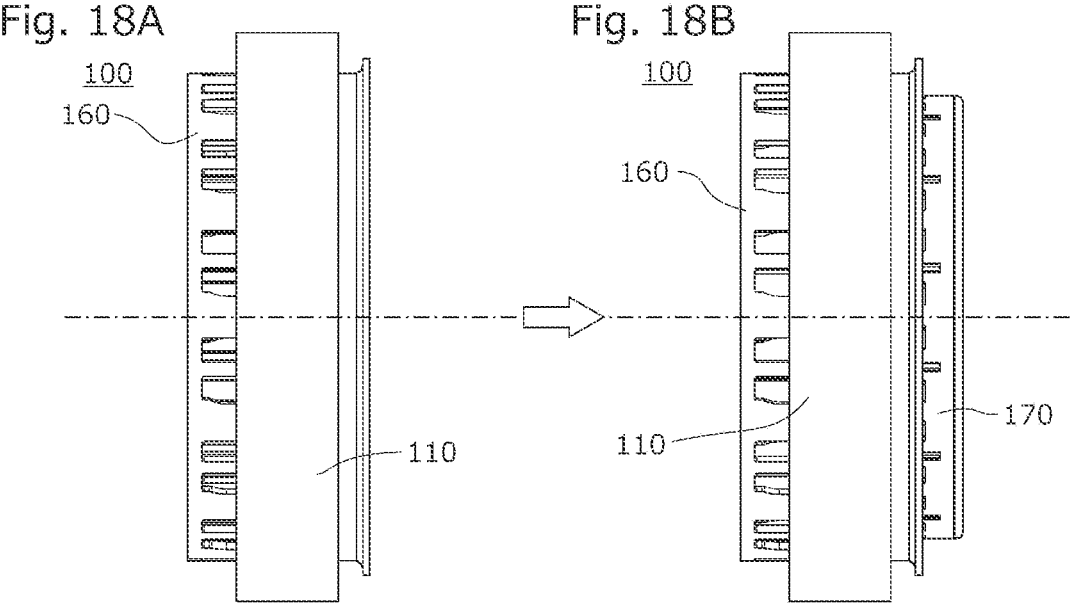
FIG. 18A and FIG. 18B are side views of the cam clutch shown in FIG. 1 illustrating the switching action from the forward lock mode to a two-way lock mode.
Figure 18B:
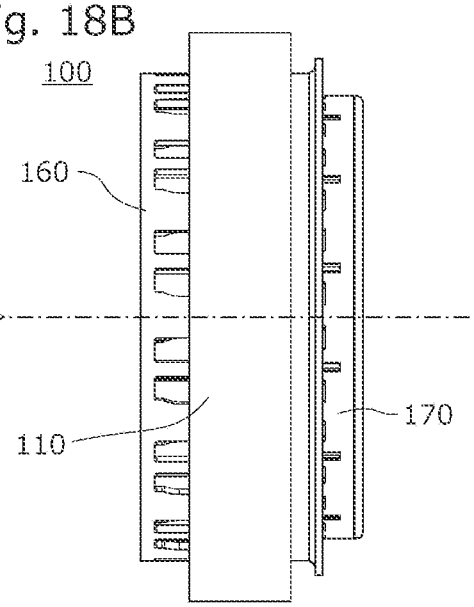
Figure 19A:
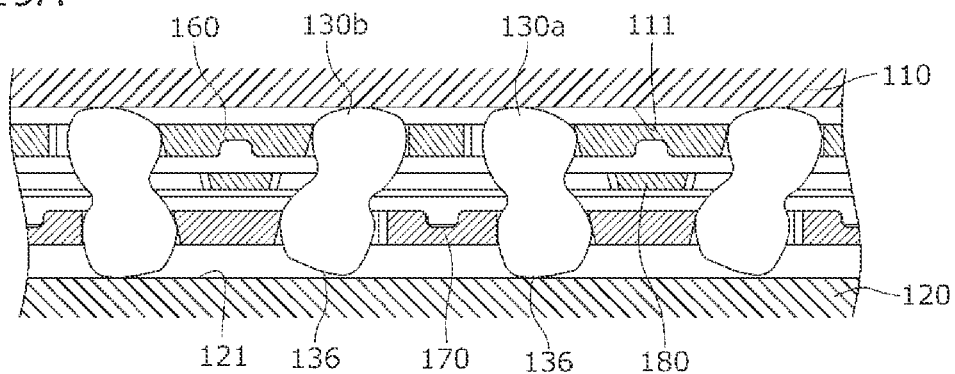
FIG. 19A and FIG. 19B are schematic diagrams of the cam clutch shown in FIG. 1 illustrating the switching action from the forward lock mode to the two-way lock mode.
Figure 19B:
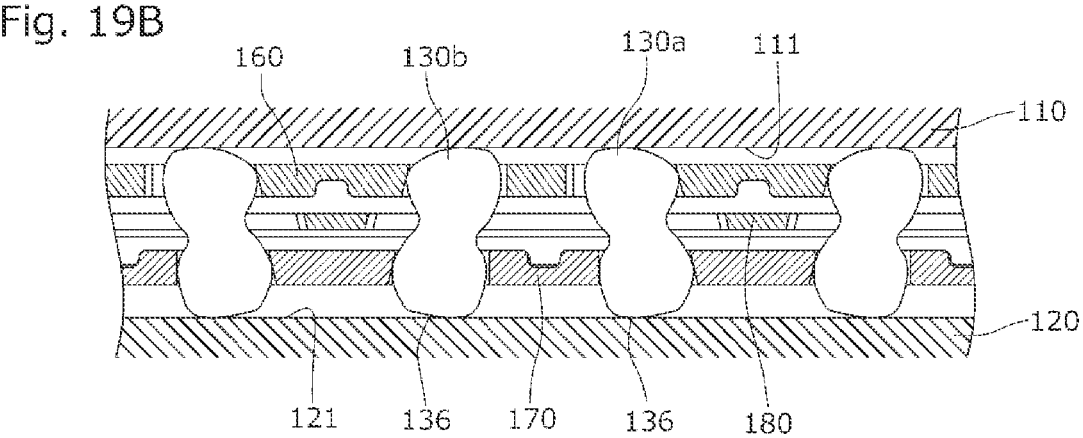

When the rotation ring 143 is rotated in the forward lock mode of the cam clutch 100 shown in FIG. 18A and FIG. 19A to move the outer-cage protruding member 169 and inner-cage protruding member 179 from P1 to P3, the inner-cage protruding member 179 alone slides on an inner slanted guide portion 142c6 over to an inner retract guide portion 142b3, as shown in FIG. 15, thereby moving the inner cage ring 170 axially frontward as shown in FIG. 18B. This causes the second opening-width transition part 175b of the second cam holding parts 173 of the inner cage ring 170 to push the leg parts 135 of the second cams 130b, as shown in FIG. 19B.

At this time, the outer-cage protruding member 169 slides only within the outer advance guide portion 141a1 and therefore does not cause the outer cage ring 160 to move in the axial direction.

Thus the second cams 130b are tilted in the engaging direction, and kept in the standby state in which the second cams 130b can start engaging with the outer race 110 and inner race 120 immediately upon torque application to the outer race 110 or the inner race 120.

The inward protrusions 186 of the position-restricting cage ring 180 are allowed to move in the circumferential direction because of the slide grooves 178 of the outer surface grooves 176 of the inner cage ring 170.

This suitably adjusts the degree of freedom of circumferential movement of the inner cage ring 170 relative to the position-restricting cage ring 180 to keep the second cams 130b in correct orientation.

Meanwhile, the rectangular first cam holding parts 172 of the inner cage ring 170 having an opening width constant in the axial direction keep the first cams 130a in the standby state in which the first cams 130a can start engaging with the outer race 110 and inner race 120 immediately upon torque application to the outer race 110 or the inner race 120.

This switches the operating mode of the cam clutch 100 from the forward lock mode to the two-way lock mode that prohibits relative rotation of the outer race 110 and inner race 120 in both forward and reverse directions.

Conversely, to switch the operation mode of the cam clutch 100 from the two-way lock mode to the forward lock mode, the rotation ring 143 is rotated to move the outer-cage protruding member 169 and inner-cage protruding member 179 from P3 to P1, causing only the inner-cage protruding member 179 to slide on the inner slanted guide portion 142c6 over to the inner advance guide portion 142a1 as shown in FIG. 15, so that the inner cage ring 170 is moved axially rearward.

At this time, the outer-cage protruding member 169 slides only within the outer advance guide portion 141a1 and therefore does not cause the outer cage ring 160 to move in the axial direction.

This movement causes the first opening-width transition part 175a of the second cam holding parts 173 of the inner cage ring 170 to push the leg parts 135 of the second cams 130b, so that the second cams 130b are tilted in the disengaging direction, and kept in the orientation in which the inner-race engaging surface 136 of the second cam 130b is separated from the raceway 121 of the inner race 120.

Meanwhile, the first cams 130a are kept in the standby state in which the first cams 130a can start engaging with the outer race 110 and inner race 120 immediately upon torque application to the outer race 110 or the inner race 120, as described above.

In this way, the operation mode of the cam clutch 100 is switched from the two-way lock mode to the forward lock mode.

Figure 20A:
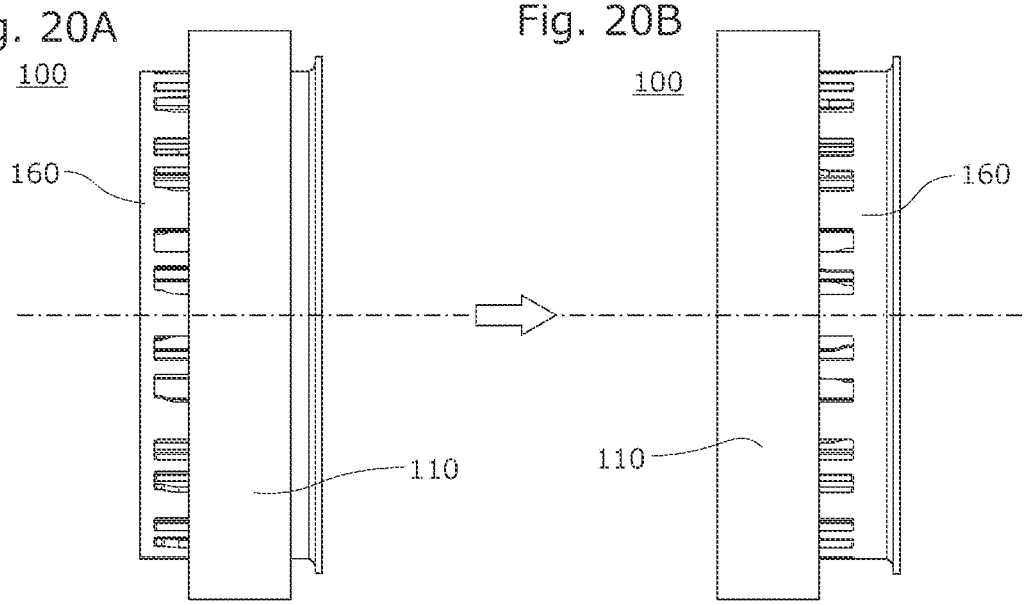
FIG. 20A and FIG. 20B are side views of the cam clutch shown in FIG. 1 illustrating the switching action from the forward lock mode to a reverse lock mode.
Figure 20B:
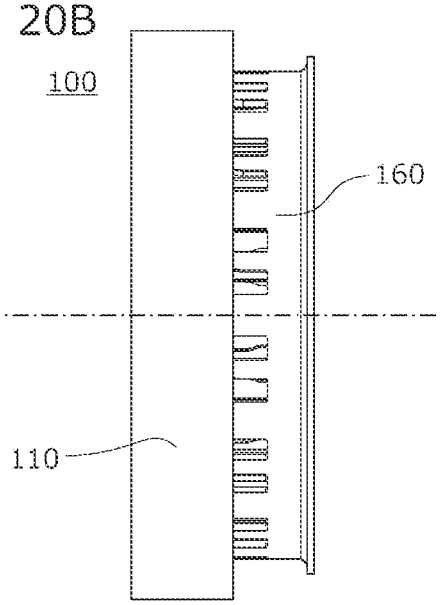
Figure 21A:
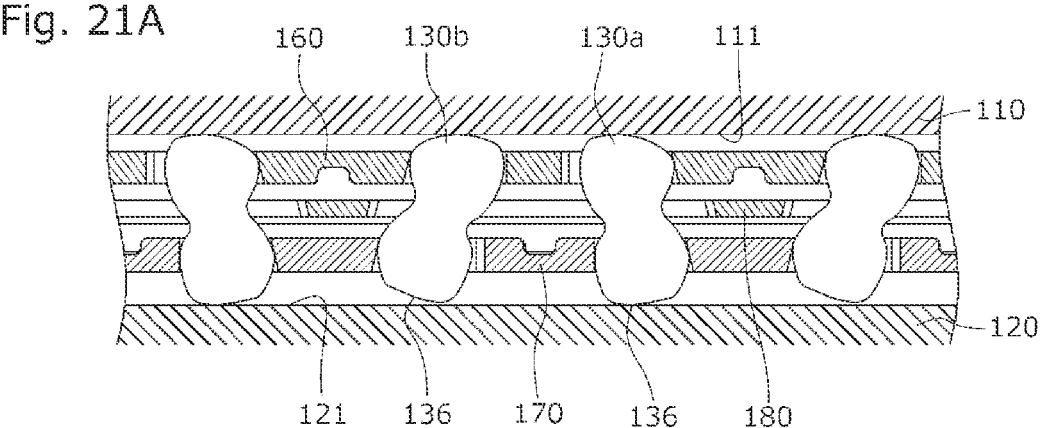
FIG. 21A and FIG. 21B are schematic diagrams of the cam clutch shown in FIG. 1 illustrating the switching action from the forward lock mode to the reverse lock mode.
Figure 21B:
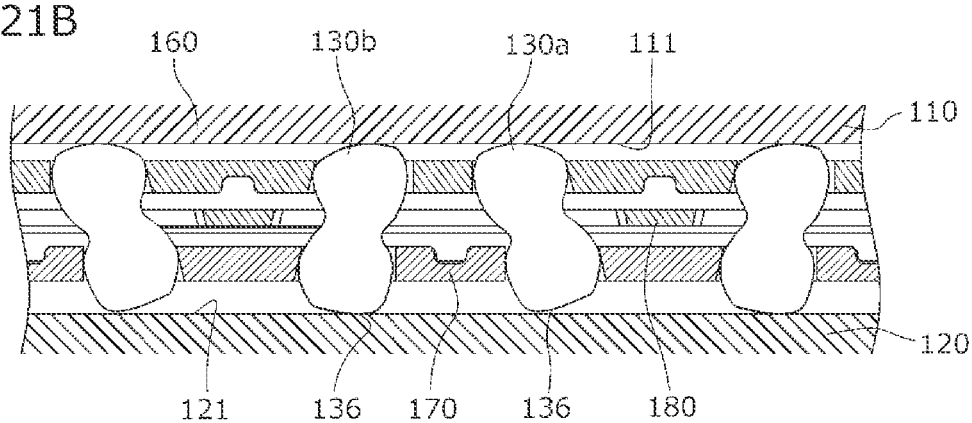

Further, when the rotation ring 143 is rotated in the forward lock mode of the cam clutch 100 shown in FIG. 20A and FIG. 21A to move the outer-cage protruding member 169 and inner-cage protruding member 179 from P1 to P4, the outer-cage protruding member 169 and inner-cage protruding member 179 respectively slide on the outer slanted guide portion 141c1 and inner slanted guide portion 142c1 over to the outer retract guide portion 141b1 and inner retract guide portion 142b1, as shown in FIG. 15, thereby moving both of the outer cage ring 160 and inner cage ring 170 axially frontward as shown in FIG. 20B. This causes the second opening-width transition part 164b of the first cam holding parts 162 of the outer cage ring 160 to push the head parts 132 of the first cams 130a as shown in FIG. 21B.

Thus the first cams 130a are tilted in the disengaging direction, and kept in the orientation in which the inner-race engaging surface 136 of the first cams 130a is separated from the raceway 121 of the inner race 120.

The leg parts 135 of the second cams 130b are pushed by the action of the second opening-width transition part 175b of the second cam holding parts 173 of the inner cage ring 170.

Thus the second cams 130b are tilted in the engaging direction, and kept in the standby state in which the second cams 130b can start engaging with the outer race 110 and inner race 120 immediately upon torque application to the outer race 110 or the inner race 120.

At this time, as described above, the degree of freedom of circumferential movement of the inner cage ring 170 relative to the position-restricting cage ring 180 is adjusted suitably and the second cams 130b are kept in correct orientation.

This switches the operating mode of the cam clutch 100 from the forward lock mode to the reverse lock mode that prohibits relative rotation of the outer race 110 and inner race 120 in the reverse direction.

Conversely, to switch the operation mode of the cam clutch 100 from the reverse lock mode to the forward lock mode, the rotation ring 143 is rotated to move the outer-cage protruding member 169 and inner-cage protruding member 179 from P4 to P1, causing the outer-cage protruding member 169 and inner-cage protruding member 179 to respectively slide on the outer slanted guide portion 141c1 and inner slanted guide portion 142c1 over to the outer advance guide portion 141a1 and inner advance guide portion 142a1 as shown in FIG. 15, so that the outer cage ring 160 and inner cage ring 170 are both moved axially rearward.

This movement causes the first opening-width transition part 164a of the first cam holding parts 162 of the outer cage ring 160 to push the head parts 132 of the first cams 130a, so that the first cams 130a are tilted in the engaging direction, and kept in the standby state in which the first cams 130a can start engaging with the outer race 110 and inner race 120 immediately upon torque application to the outer race 110 or the inner race 120.

At this time, as described above, the degree of freedom of circumferential movement of the outer cage ring 160 relative to the position-restricting cage ring 180 is adjusted suitably and the first cams 130a are kept in correct orientation.

Meanwhile, the first opening-width transition part 175a of the second cam holding parts 173 of the inner cage ring 170 push the leg parts 135 of the second cams 130b, so that the second cams 130b are tilted in the disengaging direction, and kept in the orientation in which the inner-race engaging surface 136 of the second cam 130b is separated from the raceway 121 of the inner race 120.

In this way, the operation mode of the cam clutch 100 is switched from the reverse lock mode to the forward lock mode.

As described above, in the cam clutch 100 of this embodiment, the outer cage ring 160 is assigned the function of controlling the orientation of the first cams 130a, the inner cage ring 170 is assigned the function of controlling the orientation of the second cams 130b, and the degree of freedom of circumferential movement of the outer cage ring 160 and inner cage ring 170 are restricted by the position-restricting cage ring 180, in a manner that one or both of the first cams 130a and second cams 130b can be tilted to change the orientation and maintained in that orientation only by moving one or both of the outer cage ring 160 and inner cage ring 170 in the axial direction.

The cam clutch 100 is thus designed to offer high-functionality of being switchable to four operation modes with a simple structure.

By restricting the degree of freedom of the outer cage ring 160 and inner cage ring 170, simultaneous wedging of both of the first cams 130a and second cams 130b against the outer race 110 and inner race 120 in the transition of cam orientation is avoided. Thus smooth operation can be realized and high responsiveness can be achieved.

Since the axial movement of the outer cage ring 160 and inner cage ring 170 is controlled only by rotation of the rotation ring 143, the cam clutch 100 can switch to four operation modes in an even simpler manner.

The outer slanted guide portion 141c and inner slanted guide portion 142c are not aligned in the same radial direction from the rotation axis C. Therefore, when the rotation ring 143 is rotated, at least one of the outer-cage protruding member 169 and inner-cage protruding member 179 stays in one of the outer advance guide portion 141a, outer retract guide portion 141b, inner advance guide portion 142a, and inner retract guide portion 142b. This means that the operation modes are switched with one of the outer cage ring 160 and inner cage ring 170 being axially fixed in position, and thus the mode switching is performed in a stable manner.

Another advantage is improved space economy particularly in the axial direction, compared for example with a configuration in which the outer cage ring 160 and inner cage ring 170 are moved by respective axially moving cylinders.

While one embodiment of the present invention have been described in detail, the present invention is not limited to the above-described embodiment and may be carried out with various design changes without departing from the scope of the present invention set forth in the claims.

In the configuration described in the above embodiment, the cam clutch is in the forward lock mode when the outer cage ring and inner cage ring are positioned on the rear side in the axial direction. The relationship between the operation mode of the cam clutch and the axial position of the outer cage ring and inner cage ring is not limited to this particular example.

For example, the cam clutch may be configured to switch to the free mode, or two-way lock mode, or reverse lock mode, when the outer cage ring and inner cage ring are positioned on the rear side in the axial direction.

In each of the operation modes except for the two-way lock mode, one or both of the first cams and second cams may be configured to separate from the outer race instead of the inner race as described in the above embodiment.

The rotation ring in the embodiment described above includes an outer tubular wall between the outer guide and the outer cage ring, and an inner tubular wall between the inner guide and the inner cage ring. The configuration of the rotation ring is not limited to this example. For example, an axially extending columnar body may be provided each between the outer guide and the outer cage ring, and between the inner guide and the inner cage ring, and an outer-cage protruding part and an inner-cage protruding part may be provided such as to be movable thereon.

The switch actuating mechanism such as the one in the above-described embodiment for axially moving the outer cage ring and inner cage ring to respective predetermined positions is well-suited to move two coaxial rotatable components in the axial direction from outside. This configuration is not limited to cam clutches such as the one described above and may find various other applications where similar operation is required.

What is claimed is:

1. A cam clutch comprising:
an outer race and an inner race that are provided to be coaxial and rotatable relative to each other; and
a plurality of cams that are circumferentially arranged between the outer race and the inner race, the plurality of cams including first cams and second cams that wedge against the outer race and the inner race in different directions from each other,
the cam clutch further comprising an operation mode switching mechanism that switches operation modes of the cam clutch, and a switch actuating mechanism that actuates the operation mode switching mechanism,
the operation mode switching mechanism including an outer cage ring configured to be axially movable independently of rotation of the outer race and the inner race and to change an orientation of the first cams, an inner cage ring configured to be axially movable independently of rotation of the outer race and the inner race and to change an orientation of the second cams, and a position-restricting cage ring provided between the outer cage ring and the inner cage ring and restricting a degree of freedom of circumferential movement of the outer cage ring and the inner cage ring,
the switch actuating mechanism including an outer guide defining an axial position of the outer cage ring, an inner guide provided in a fixed position relative to the outer guide and defining an axial position of the inner cage ring, and a rotation ring circumferentially movable relative to the outer guide and the inner guide and provided for controlling the axial position of the outer cage ring and the inner cage ring.

2. The cam clutch according to claim 1, wherein
the outer cage ring has, at an end portion thereof, an outer-cage protruding member radially protruding and circumferentially slidable on the outer cage ring,
the inner cage ring has, at an end portion thereof, an inner-cage protruding member radially protruding and circumferentially slidable on the inner cage ring,
the outer guide is configured to receive and allow the outer-cage protruding member to slide thereon, and include an outer advance guide portion that keeps the outer cage ring at an advanced position closer to the outer race, an outer retract guide portion that keeps the outer cage ring at a retracted position away from the outer race, and an outer slanted guide portion coupling the outer advance guide portion and the outer retract guide portion, and
the inner guide is configured to receive and allow the inner-cage protruding member to slide thereon, and include an inner advance guide portion that keeps the inner cage ring at an advanced position closer to the inner race, an inner retract guide portion that keeps the inner cage ring at a retracted position away from the inner race, and an inner slanted guide portion coupling the inner advance guide portion and the inner retract guide portion.

3. The cam clutch according to claim 2, wherein
the rotation ring includes an outer tubular wall formed between the outer cage ring and the outer guide, an inner tubular wall formed between the inner cage ring and the inner guide, an outer slide hole extending therethrough the outer tubular wall, and an inner slide hole extending through the inner tubular wall,
the outer slide hole is formed such as to allow the outer-cage protruding member to pass through and make contact with the outer guide, and
the inner slide hole is formed such as to allow the inner-cage protruding member to pass therethrough and make contact with the inner guide.

4. The cam clutch according to claim 2, wherein the outer advance guide portion and the inner advance guide portion lie within a same circumferential range at least at one or more points, and the outer retract guide portion and the inner retract guide portion lie within a same circumferential range at least at one or more points.

5. The cam clutch according to claim 1, wherein
the outer cage ring and the inner cage ring each include first cam holding parts and second cam holding parts that respectively hold the first cams and the second cams,
the second cam holding parts of the outer cage ring and the first cam holding parts of the inner cage ring are configured to have an opening width constant in an axial direction, and
the first cam holding parts of the outer cage ring and the second holding parts of the inner cage ring are configured to have an opening-width transition part with an opening width continuously changing in the axial direction.

6. The cam clutch according to claim 1, wherein
the outer cage ring includes, on an inner surface, an axially extending inner surface groove,
the inner cage ring includes an axially extending outer surface groove on an outer surface, and
the position-restricting cage ring includes an outward protrusion radially projecting outward from one axial end and slidably engaged with the inner surface groove of the outer cage ring, and an inward protrusion radially projecting inward from another axial end and slidably engaged with the outer surface groove of the inner cage ring.

7. The cam clutch according to claim 6, wherein
the inner surface groove includes a slide groove extending circumferentially so as to allow circumferential movement of the outward protrusion when the outer cage ring is set to keep the first cams in an engaged state, and
the outer surface groove includes a slide groove extending circumferentially so as to allow circumferential movement of the inward protrusion when the inner cage ring is set to keep the second cams in an engaged state.

8. The cam clutch according to claim 1, wherein the outer race is provided with a position restricting part that restricts axial movement of the plurality of cams.

9. The cam clutch according to claim 1, wherein the plurality of cams have side faces in contact with the outer cage ring and the inner cage ring, the side faces being a curved surface formed to have a constant width, irrespective of cam orientation.

10. The cam clutch according to claim 9, wherein
the side faces of the plurality of cams in contact with the outer cage ring are formed along curves of involutes of a same basic circle as viewed in an axial direction in plan view, and
the side faces of the plurality of cams in contact with the inner cage ring are formed along curves of involutes of a same basic circle as viewed in an axial direction in plan view.

11. An axial movement coordination mechanism for axially moving a first rotating member and a second rotating member, which are coaxial and rotatable relative to each other in a coordinated manner, the mechanism comprising:
- a first guide defining an axial position of the first rotating member;
- a second guide provided in fixed position relative to the first guide and defining an axial position of the second rotating member,
- a rotation ring circumferentially movable relative to the first guide and the second guide and provided for controlling the axial positions of the first rotating member and the second rotating member,
- the first rotating member has, at an end portion thereof, a first protruding member radially protruding and circumferentially slidable on the first rotating member,
- the second rotating member has, at an end portion thereof, a second protruding member radially protruding and circumferentially slidable on the second rotating member,
- the first guide is configured to receive and allow the first protruding member to slide thereon, and include a first advance guide portion that keeps the first rotating member at an advanced position, a first retract guide portion that keeps the first rotating member at a retracted position, and a first slanted guide portion coupling the first advance guide portion and the first retract guide portion; and
- the second guide is configured to receive and allow the second protruding member to slide thereon, and include a second advance guide portion that keeps the second rotating member at an advanced position, a second retract guide portion that keeps the second rotating member at a retracted position, and a second slanted guide portion coupling the second advance guide portion and the second retract guide portion.

12. The axial movement coordination mechanism according to claim 11, wherein
- the rotation ring includes a first tubular wall formed between the first rotating member and the first guide, a second tubular wall formed between the second rotating member and the second guide, a first slide hole extending through the first tubular wall, and a second slide hole extending through the second tubular wall,
- the first slide hole being formed so as to allow the first protruding member to pass therethrough and make contact with the first guide,
- the second slide hole being formed so as to allow the second protruding member to pass therethrough and make contact with the second guide.

* * * * *